(12) United States Patent
Orms

(10) Patent No.: US 11,014,032 B2
(45) Date of Patent: May 25, 2021

(54) ANTI-CORROSION FLUID FILTER SYSTEM

(71) Applicant: Scavenger Manufacturing, LLC, White Oak, TX (US)

(72) Inventor: Lewis E. Orms, White Oak, TX (US)

(73) Assignee: Scavenger Manufacturing LLC, White Oak, TX (US)

( * ) Notice: Subject to any disclaimer, the term of this patent is extended or adjusted under 35 U.S.C. 154(b) by 366 days.

(21) Appl. No.: 15/874,255

(22) Filed: Jan. 18, 2018

(65) Prior Publication Data
US 2018/0200656 A1    Jul. 19, 2018

Related U.S. Application Data

(60) Provisional application No. 62/448,072, filed on Jan. 19, 2017.

(51) Int. Cl.
| | |
|---|---|
| *B01D 39/20* | (2006.01) |
| *B01D 39/08* | (2006.01) |
| *C02F 1/50* | (2006.01) |
| *C02F 1/66* | (2006.01) |
| *C22C 9/04* | (2006.01) |
| *B01D 39/10* | (2006.01) |

(52) U.S. Cl.
CPC ....... *B01D 39/2027* (2013.01); *B01D 39/086* (2013.01); *C02F 1/50* (2013.01);
(Continued)

(58) Field of Classification Search
CPC ........ B01D 15/00; B01D 17/00; B01D 35/00; B01D 35/02; B01D 35/023; B01D 39/00; B01D 39/10; B01D 39/12; B01D 39/14; B01D 39/20; B01D 39/2027; B01D 39/2031; B01D 2101/00; B01D 2239/0471; B01D 2239/0485; B02D 2215/00; C02F 1/00; C02F 1/28; C02F 1/281; C02F 1/283; C02F 5/00; C02F 5/08; C02F 5/083; C02F 2101/00; C02F 2101/101; C02F 2101/34; C02F 2101/40; C02F 2103/00; C02F 2103/008; C02F 2103/06; C02F 2103/10;
(Continued)

(56) References Cited

U.S. PATENT DOCUMENTS

| | | | |
|---|---|---|---|
| 3,448,034 A | 6/1969 | Craft et al. | |
| 4,715,325 A * | 12/1987 | Walker | F02M 25/00 123/1 A |

(Continued)

FOREIGN PATENT DOCUMENTS

WO    WO-2016193574 A1 * 12/2016    ............. B01D 71/02

OTHER PUBLICATIONS

"Bronze Corrosion", article taken from the internet on Apr. 16, 2020; article publicly available from at least May 22, 2013. (Year: 2013).*

(Continued)

*Primary Examiner* — Clare M Perrin
(74) *Attorney, Agent, or Firm* — Vincent J. Allen; J. Andrew Reed; Carstens & Cahoon, LLP

(57) ABSTRACT

An apparatus, method, and system for fluid filtration utilizing a metal alloy core comprised of zinc, nickel, tin, lead, silver, iron, and a remainder of copper. The shapes and sizes of the metal alloy can comprise rods, balls, shavings, tubes, or shot. These shapes and sizes of the metal alloy can then be placed within the various vessels used in the oil and natural gas industries.

9 Claims, 8 Drawing Sheets

(52) U.S. Cl.
CPC .............. *C02F 1/505* (2013.01); *C02F 1/66* (2013.01); *C22C 9/04* (2013.01); *B01D 39/10* (2013.01); *B01D 39/20* (2013.01); *B01D 2239/0442* (2013.01); *B01D 2239/10* (2013.01); *C02F 2303/04* (2013.01); *C02F 2303/08* (2013.01); *C02F 2303/22* (2013.01)

(58) Field of Classification Search
CPC .............. C02F 2103/12; C02F 2103/16; C02F 2103/34; C02F 2303/00; C02F 2303/08; C02F 2303/22
USPC ....... 210/764, 170.04, 222, 263, 503, 500.1, 210/502.1; 166/902
See application file for complete search history.

(56) References Cited

U.S. PATENT DOCUMENTS

| | | | | |
|---|---|---|---|---|
| 5,126,046 | A | * | 6/1992 | Gomez .................... C02F 1/48 210/446 |
| 2004/0089610 | A1 | * | 5/2004 | Melton .................. C02F 1/006 210/696 |
| 2006/0144795 | A1 | * | 7/2006 | Madden .................... C02F 1/48 210/696 |
| 2018/0147534 | A1 | * | 5/2018 | Lescoche ........... B01D 67/0067 |
| 2019/0040499 | A1 | * | 2/2019 | Chen ........................ C22F 1/08 |

OTHER PUBLICATIONS

Julia L. Clement, et al, Antibacterial Silver, School of Chemistry and Applied Chemistry, University of Wales College of Cardiff, vol. 1, Nos. 5-6, 1994, 16 pgs.

Denis Brondel, et al, Corrosion in he Oil Industry, Oilfield Review, Apr. 1994, 66 pgs.

Linda Gaverice, editor, Forms of Corrosion in the Petrochemical Industry, Corrosion in the Petrochemical Industry (06393G), 1994 ASM International, www.asminternational.org, 10 pgs.

Handling Scale in Oil Production Facilities, Statoil 2014, Published Sep. 8, 2007, updated Sep. 23, 2009, http://www.statoil.com.

* cited by examiner

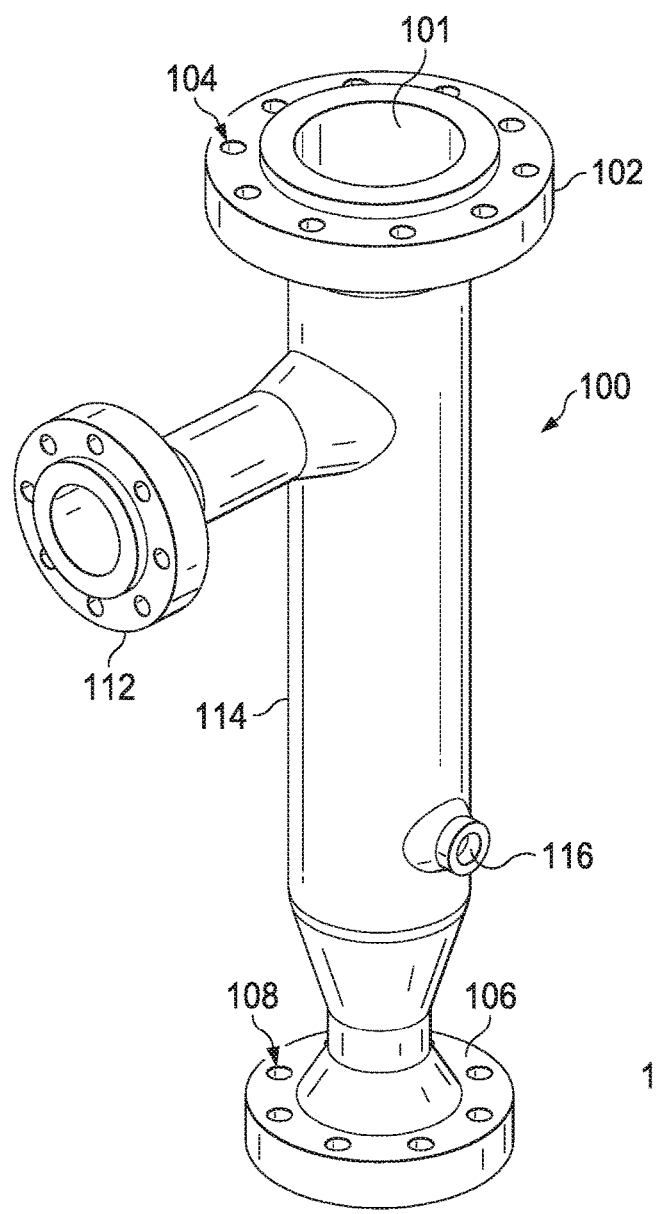
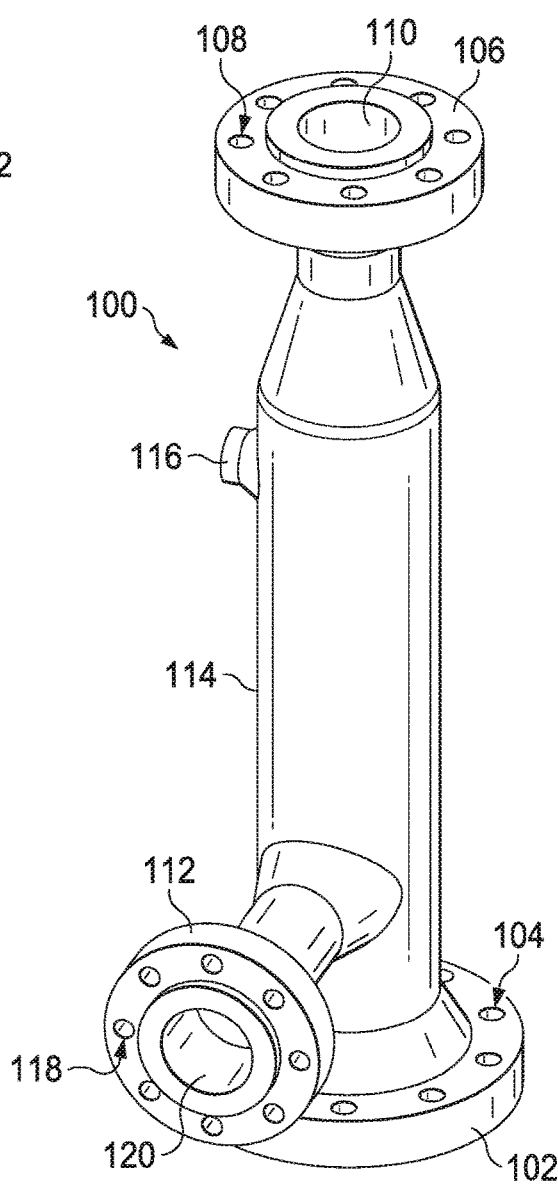
FIG. 1A
FIG. 1B
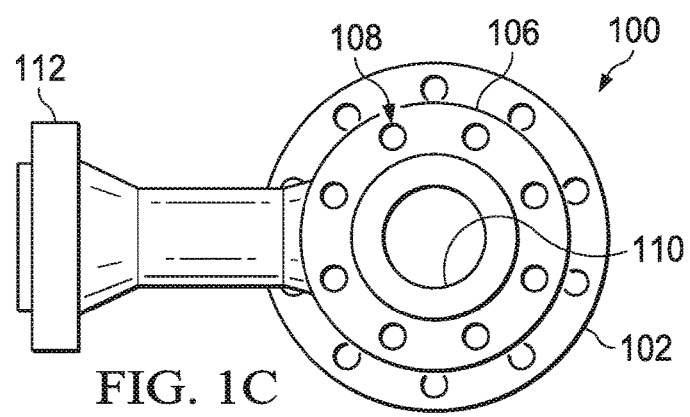
FIG. 1C

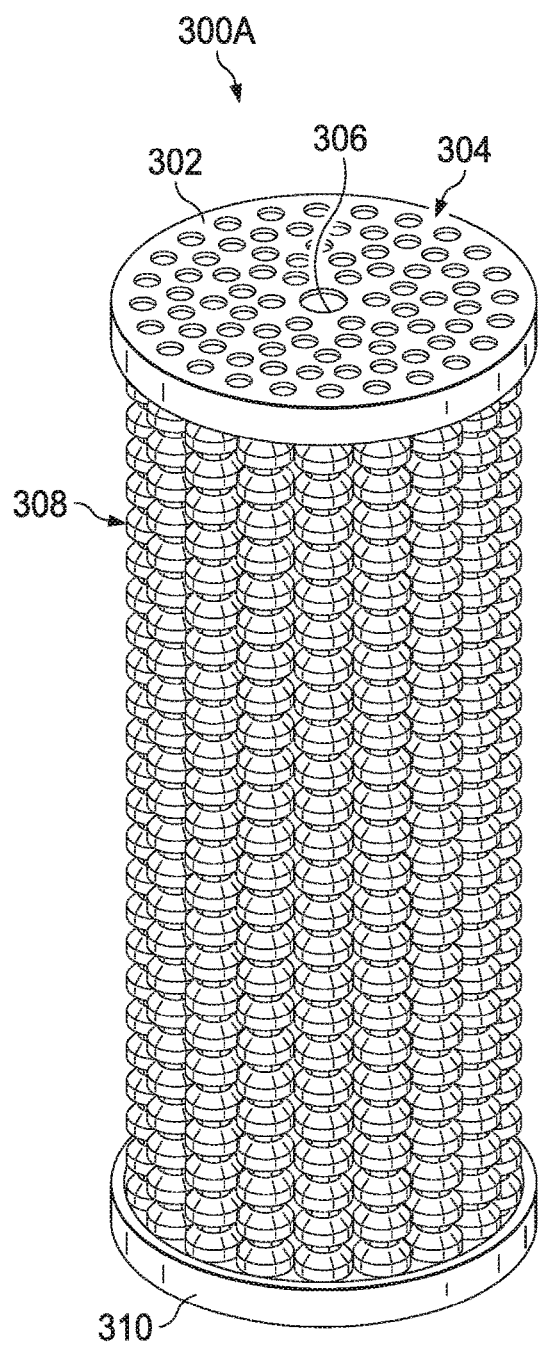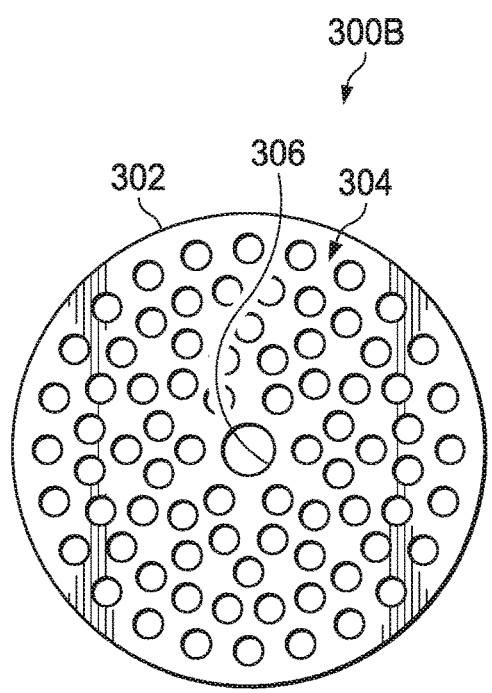
FIG. 3A
FIG. 3B

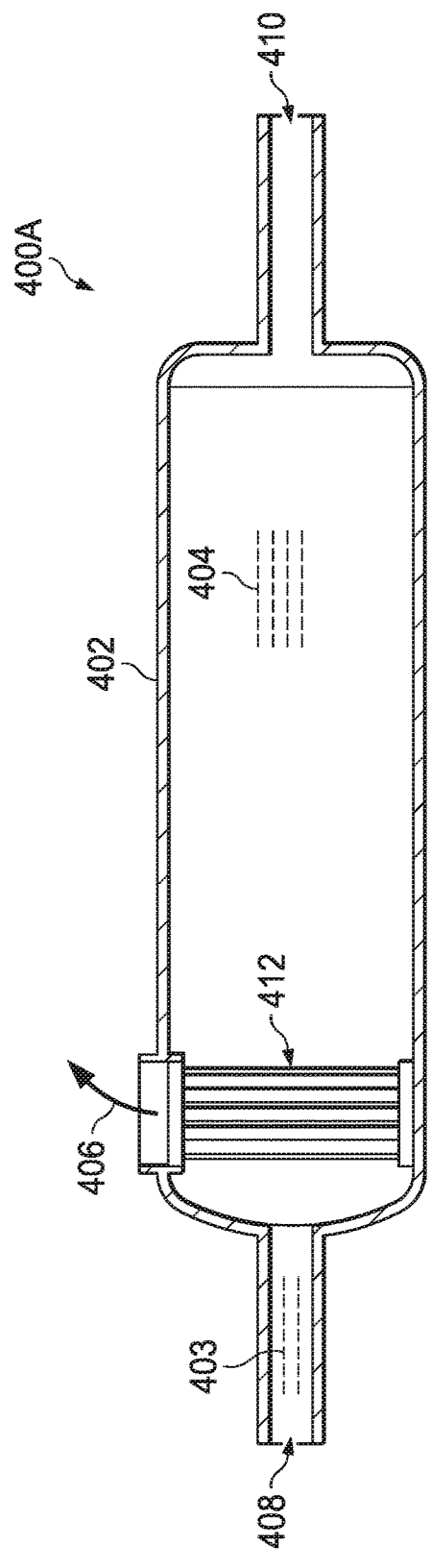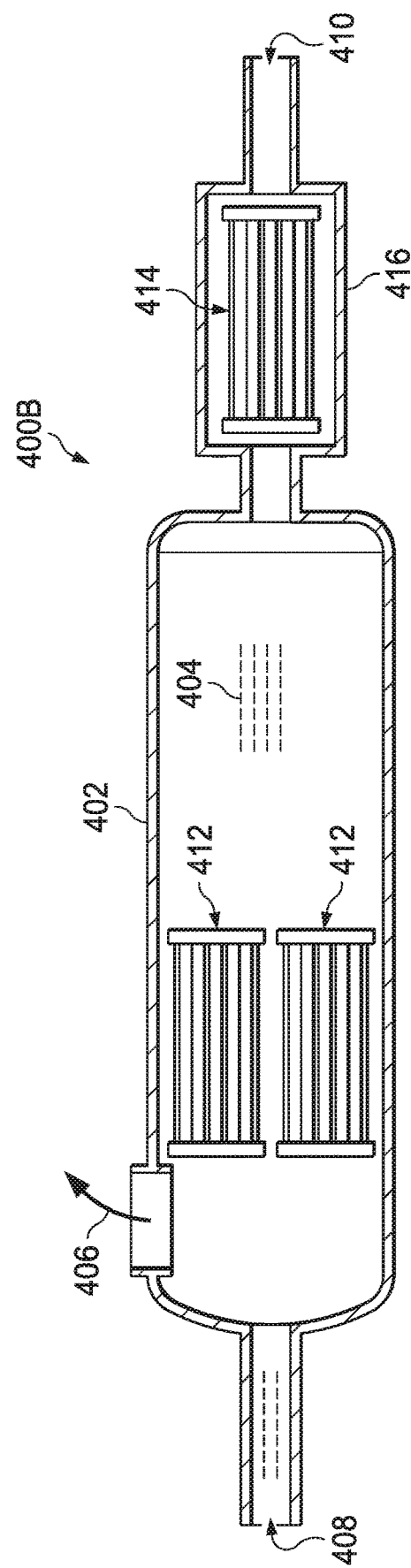
FIG. 4A
FIG. 4B

ANTI-CORROSION FLUID FILTER SYSTEM

CROSS-REFERENCE TO RELATED APPLICATION

This application claims the benefit of and priority to U.S. Provisional Patent Application No. 62/448,072 filed Jan. 19, 2017, the technical disclosure of which is hereby incorporated herein by reference.

CROSS-REFERENCE TO RELATED APPLICATIONS

Not Applicable

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, TABLE, OR COMPUTER PROGRAM LISTING APPENDIX

Not Applicable

STATEMENT REGARDING PRIOR DISCLOSURES BY THE INVENTOR OR A JOINT INVENTOR

Not Applicable

BACKGROUND

1. Field of the Disclosure

The present invention generally relates to the field of fluid filtration. Specifically in its preferred embodiments, the present invention discloses a fluid filtration system utilizing silver for the oil and natural gas production industry.

2. Background

In the oil and gas industries, there is a large amount of corrosion and scale that builds up over time due to the acidic nature of the fluids involved. This corrosion and scale is not only harmful to the metals used for the transfer of the fluids, but also for the environment into which the fluid is released. In the production of oil, the fluids within the wells often contain substantial quantities of corrosive elements that have a destructive effect on flow lines, oil water separators, storage vessels, and other equipment used at the well sites. The corrosiveness causes increased wear and tear on the equipment and in some cases causes the entire system to be shut down for replacement of a single worn out part. While filtering systems can be used to treat the fluids, most filtering systems require magnets, chemicals, or electricity in order to be effective. A magnetic system uses the magnetic field to separate magnetic particles from non-magnetic particles within the fluid. While chemical filtration systems rely on additives, those additives can be extremely harsh on the environment. Electrical filtration systems are similar to the magnetic filters, and can use a combination of the electrical field and electrical stimulus to cause reactions or changes to the chemical structure of the fluid. Other filtering systems have relied upon metallurgical reactions in order to filter the corrosive properties out of the fluids.

The corrosiveness is partially due to the metallic elements within the fluids, and metals used in the transportation of those fluids during production. Metallic ions in the various fluids can cause reactions along the metal surfaces used to transport, store or process the fluids. Other factors such as the temperature of the fluid, the pressures involved, and the stresses on the metals used from transportation, storage, and production can result in increased corrosion. Corrosion can result from the oxygen, acids, carbon dioxide, and sulfur within the various fluids used during drilling, transport, storage, and production. In some cases, electrical systems that are relied on during the drilling, transportation, storage, and production also cause some levels of corrosion to be generated through electrochemical corrosion.

Another way to combat corrosion is through the introduction of metallic alloys. Previous systems such as that disclosed in U.S. Pat. No. 3,448,034 to Craft et al., have used an alloy comprised of: copper, zinc, nickel, lead, tin, iron, antimony, sulfur, and manganese, to cause the metallurgical reactions that result in a filtering or anti-corrosion function. To combat the corrosive properties, fluids must flow across or through the metal alloy in order to produce a reaction that results in corrosive properties of the fluid being transferred either to metal alloy, or for metallic elements of the metal alloy to be added to the fluid. The greater the surface area of the metallic alloy the fluid can come in contact with, the more effective the reaction will be.

Silver is known for its antimicrobial properties, which help kill any microbial "bugs" that may also be present and add to the corrosion along metal surfaces that the fluid meets. For many years, people have used silver individually as a filter, and for the sterilization of water. However, it has not previously been introduced to fight corrosion, though it has shown to be quite effective even though silver itself is very susceptible to corrosion. If this corrosion can be reduced through increases in the pH levels above acidic level, the effectiveness of the well system as a whole can also be increased.

BRIEF SUMMARY

Disclosed herein are an apparatus, method, and related system for providing filtration of corrosive fluids such as those used in the oil and gas industry. The apparatus assists in the prevention of corrosion in steel pipe, vessels, and flow tubes that contain fluids that are acidic in nature. The system can employ methods of use of the apparatus that comprises a metal alloy combination of several different elements with distinct parameters comprising zinc, nickel, silver, yin lead, iron, and copper. This metal alloy can be used to induce reactions within the fluid in order to reduce the corrosive properties and change the pH level.

The apparatus can be used in several different shapes and sizes to make maximum contact with the water and oil to reduce the corrosiveness of these fluids. These shapes and sizes can be utilized in both above and in ground systems as well as in line systems. The specific combination of elements when contacting the mixture of oil and water, acts as a catalyst to initiate a chemical reaction, which helps change the pH of the treated fluids.

The chemistry of the fluids being treated can determine the shape and form of the metal being used. For example, the shapes can include a single or a plurality of rods, shots, balls, shavings, tubes, etc., or a combination of shapes can be used to increase the surface area the fluid will touch during the filtering process. One method includes forming the alloy material into any one of or a combination of the previously discussed shapes, placing it within a filter canister the fluid flows through, allowing the fluid to be treated without affecting the flow of the fluid. Another method allows the alloy to be placed within the vessel that needs to be protected, thus allowing the fluid within that vessel to be treated.

BRIEF DESCRIPTION OF THE DRAWINGS

FIG. 1A illustrates a perspective view of a filter system housing.

FIG. 1B illustrates a side perspective view of a filter system housing.

FIG. 1C illustrates a top view of a filter system housing.

FIG. 3A shows a perspective view of a filter system utilizing rods.

FIG. 3B shows a bottom view of the filter system end plates.

FIG. 4A illustrates an above ground embodiment with a removable filter system.

FIG. 4B illustrates an above ground embodiment with a removable filter system and a filter canister along the output.

DETAILED DESCRIPTION

Figure 2A:
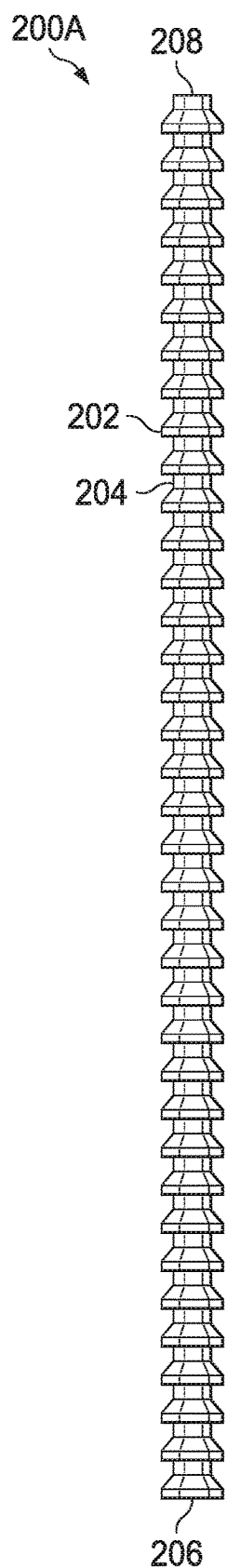
FIG. 2A illustrates a view of a metal alloy in rod form.

Disclosed herein are an apparatus, method, and related system for providing a filtration of fluids useful in the oil and gas industry. The apparatus assists in the prevention of corrosion in steel pipe, vessels, and flow tubes that contain fluids that are acidic in nature. The system employs methods of use of the apparatus that comprises a metal alloy combination of several different elements with distinct parameters comprising zinc, nickel, silver, tin lead, iron, and copper. This metal alloy can be used to induce metallurgical reactions within the fluid in order to reduce the corrosive properties and change the pH level of the fluid.

The filtering apparatus is comprised of a plurality of metal alloy components configured to be placed within a vessel, wherein that metal alloy is used to trigger chemical reactions within fluids that are exposed to the alloy. As fluids encounter the alloy, either by flowing through a plurality of alloy objects held within a vessel or by coming in contact with the metal alloy as it rests within a vessel that holds fluid, a chemical reaction occurs that can reduce the corrosive nature of the fluid, and assist in the reduction of scaling caused by the fluid.

The fluid can be an oil-water mixture, or other fluids (e.g., brine, drilling mud, or injection water) used in the oil and natural gas drilling or production industry. These fluids are traditionally very corrosive due to the acidic properties developed over many hundreds or even thousands of years within the earth. The scaling and corrosive damage the fluid causes to oil and natural gas well systems results in a large expense for the industry, and thus a system for effectively filtering these fluids is needed. Unlike traditional filtering systems that rely on magnetic energy, electrical stimulation, or harsh chemicals, the present invention relies on the metallurgical reactions that can occur between a fluid and a metal alloy.

The fluids can contain any number of metallic or metallic based chemical elements that can react with the metals of the drilling, transport, storage, or production unit that it encounters. However, the present invention counteracts these reactions by introducing additional reactions to neutralize the effects of the fluid on the metals of the drilling, transport, storage, or production unit. Additionally, the reactions the present invention cause also act as a filter by changing the chemical properties of the fluids to reduce the acidity of the fluids. Therefore, the system does not rely on harsh chemicals or on other devices that require additional equipment to trigger the filtering. This reduces wear and tear as well as the cost for the well system as a whole.

In one embodiment of the present invention, the metal alloy comprises 20.0-24.0% zinc, 15.5-17.0% nickel, 1.5-5.25% silver, 2.5-3.5% tin, 1.5-2.5% lead, 0.5-1.5% iron with the remainder being copper. In combination, this alloy acts as a catalyst to initiate chemical reactions, which helps change the pH value of the treated fluids. This alloy can be formed into a variety of shapes and sizes to accommodate the most effective surface area and provide the most effective chemical reaction possible. Some of the shapes that can be formed include, but are not limited to rods, shot, balls, shavings, tubes or other effective shapes and sizes. These shapes can be formed in a manner to increase the turbulence of the fluid flowing within a vessel to allow better interaction between the fluid and alloy and can be used in a standing or resting fluid as well. As seen in FIGS. 3A-3D, the filter system can be used as inserts into the center of a pipe or tube, while also being used to block the path of fluid through a pipe. Shavings can be used as fillers between other shapes or on their own as in a cartridge like form. The balls can be used in much the same way as the rods, and as pieces that can easily be added to a vessel when the pH level requires a change.

FIGS. 1A-1C illustrate one embodiment of a housing 100 for the filter cartridge (not shown). The upper base 102 of the housing 100 can be round or other shape that can be utilized with other pipes or fittings within the oil or gas industry. The upper base 102 can be attached to other pipes or fittings utilizing screws or other fasteners placed through the plurality of attachment bores 104 allowing upper base port 101 to provide for fluid flow or to be sealed. The metal alloy (not shown) can be inserted and removed via the upper base port 101. The upper base port 101 can be sized and shaped to correspond to the diameter and shaped of the housing 100 and upper base 102. Similar to the upper base 102, the lower base 106 can also attach to pipes or other fittings utilizing screws or other fasteners placed through the plurality of attachment bores 108. The lower port 110 at the center of the lower base 106 allows for fluid flow in or out of the housing 100. A side port 120 at the center of the side base plate 112 and the upper port (not shown) at the center of the upper base 102 allow for fluid flow through the housing 100. The central cylinder 114 of the housing 100 provides for the placement of the filter cartridge (not shown) within the housing 100. The size of the central cylinder 114 can be increased to accommodate an increased amount of the metal alloy. Along the lower portion of the central cylinder 114 is a nozzle port 116 that allows for additional flow lines, mixing of additional fluids, or draining. The side port 120 is surrounded by the side base plate 112 that can connect to other pipes or fittings through bolts or other fasteners placed through the plurality of attachment bores 118. While shapes, sizes, and dimensions are illustrated and described herein, the present invention is not limited to the shapes, sizes and dimensions illustrated and described herein as changes thereto would not depart from the spirit of the invention. In an exemplary embodiment of the present invention, the metal alloy (not shown) would be inserted and removed from the housing 100 via the upper base port 101. Fluids enter the housing 100 through the side port 120, and exit through the lower port 110. Any residual fluids can be drained from the housing utilizing the nozzle port 116.

Figure 2B:
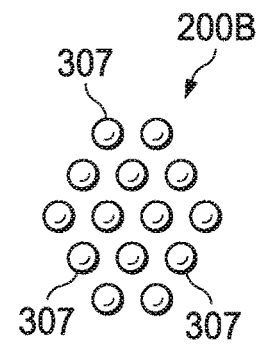
FIG. 2B illustrates a view of a metal alloy in ball or shot form.
Figure 2C:
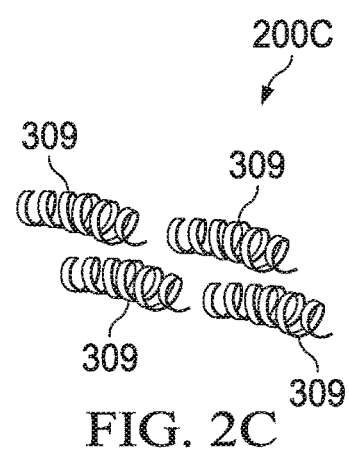
FIG. 2C illustrates a view of a metal alloy in shaving form.

FIG. 2A illustrates one of the metal alloy rods 200A that can be used within the filter cartridge system (not shown). The metal alloy rods 200A are comprised of rod teeth 202, rod valleys 204, a first rod end 206, and a second rod end 208 that is distal from the first rod end 206. The rod teeth 202 and rod valleys 204 allow for the metal alloy rod 200A to create turbulence when utilized within the filter cartridge system (not shown). Furthermore, the rod teeth 202 can also be meshed with the rod valleys 204 for an alternative embodiment of the present invention that requires a compact and tighter fit of the metal alloy rods 200A. In addition, to the metal alloy rod 200A, the metal alloy can be shaped into other forms, including but not limited to, metal alloy shot or balls 200B as shown in FIG. 2B or metal alloy shavings 200C as shown in FIG. 2C. These additional forms of the metal alloy 200B/200C can be utilized to increase turbulence of the fluid, and provide additional surface area for the fluid to come in contact with the metal alloy.

Figure 3C:
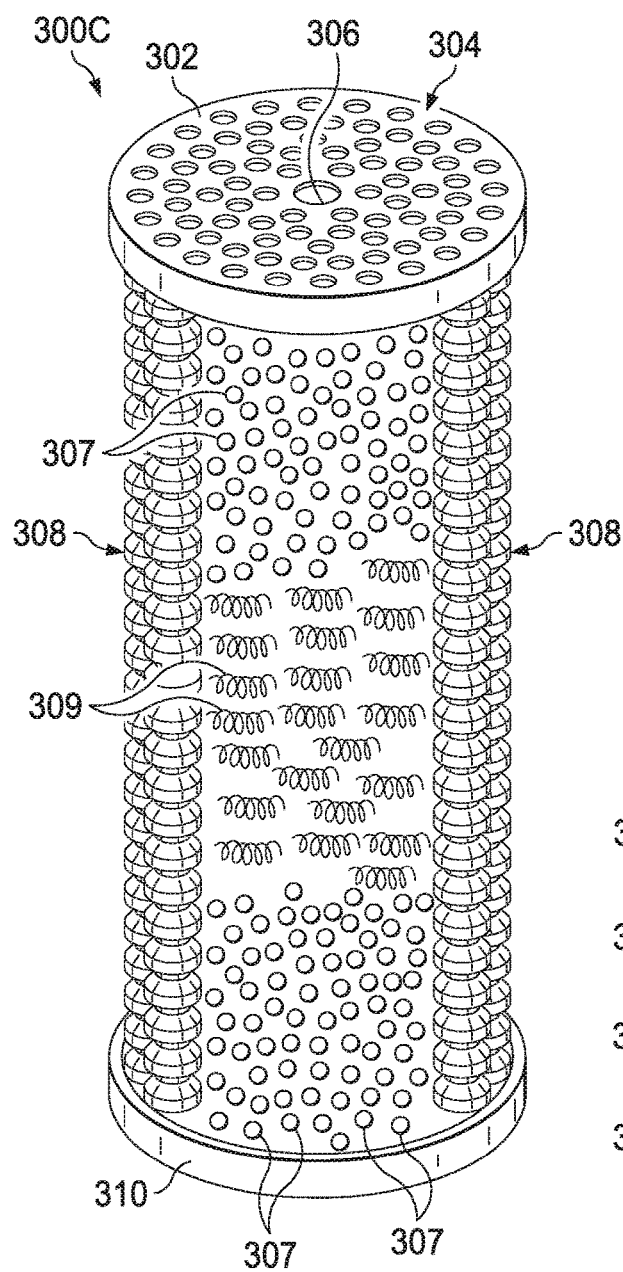
FIG. 3C shows a perspective cutaway view of a combination of metal alloy forms (rods, balls, and shavings) utilized in the filter system.
Figure 3D:
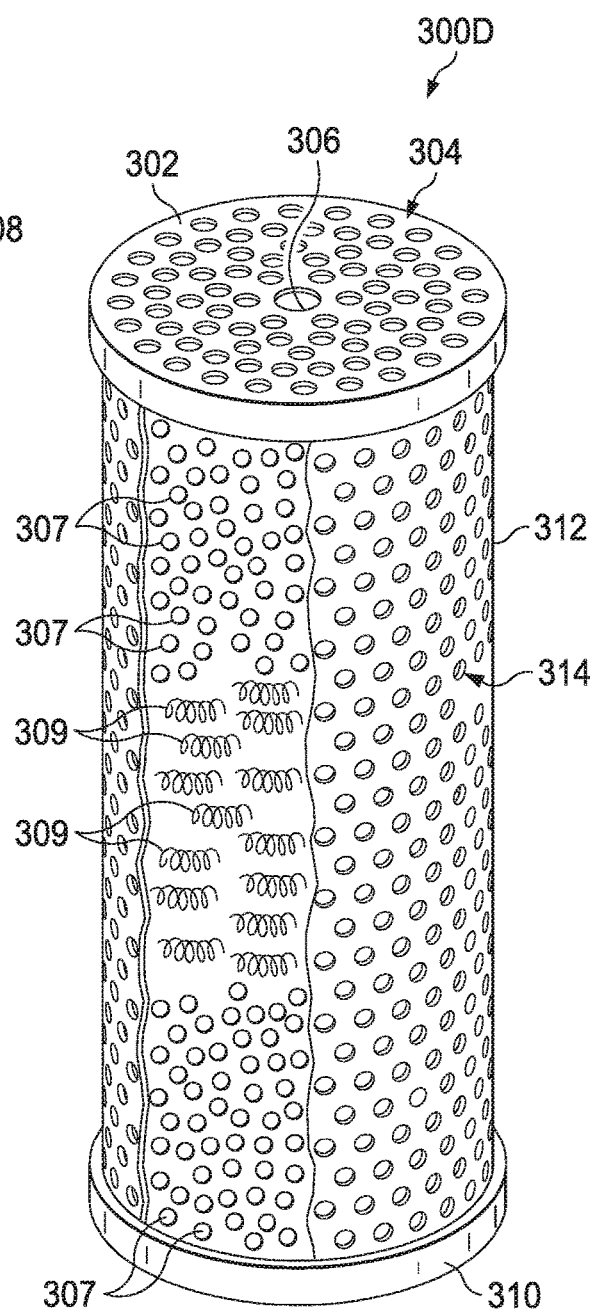
FIG. 3D shows a perspective cutaway view of a container filter system with perforated sides, and a metal alloy contained within.

FIGS. 3A-3D illustrate filter system cartridges 300A, 300B, 300C, 300D in accordance with different embodiments of the invention. In FIG. 3A, the filter cartridge 300A can be placed or suspended within a number of different housings, including but not limited to, housing 100 shown in FIGS. 1A-1C. The filter cartridge 300A is comprised of an upper filter cartridge end plate 302, and a lower filter cartridge end plate 310 with both having a central aperture 306, through the width of the end plates 302/310. FIG. 3B illustrates the central aperture 306 surrounded by the perforation bores 304 that allow fluid to travel through the filter cartridge 300B and the contained filter material such as a metal alloy. The metal alloy in FIG. 3A is a formed metal alloy rod, similar to that shown in FIG. 2A. The lip of the filter cartridge end plate 302/310 assists in constraining the metal alloy rods 308 together forming a plurality of metal alloy rods. In accordance with the present invention, an alternative embodiment that does not depart form the spirit of the invention is shown in FIG. 3C. In FIG. 3C the filter cartridge 300C is illustrated with the upper filter cartridge end plate 302 and the lower filter cartridge end plate 310 in combination with the metal alloy rods 308, creating an enclosure for other metal alloy forms such as metal alloy balls or metal alloy shot 307, or metal alloy shavings 309. The metal alloy rods 308 can be utilized in a manner that would create a curtain or cylinder wall within which the other metal alloy forms could be placed. Another alternative embodiment is illustrated in FIG. 3D. The upper filter cartridge end plate 302, and the lower filter cartridge end plate 310 are affixed or fastened to a perforated plate 312, with perforations 314 that allow fluid to enter into the filter cartridge 300D and encounter the metal alloy, shown in the illustration as metal shavings 309.

The inclusion of silver to the metal alloy discussed above has been found to represent a significant improvement over the prior art systems. The addition of silver allows the system to fight microbial bugs, which provides anticorrosive properties and allows the system to be more effective. Silver helps to stop microbial bugs, which in turn helps reduce corrosion because the microbial bugs are not attacking the metals of the drilling, transport, storage, or production units. The amount of silver used in the apparatus can be varied depending on the environment and embodiment in which it is to be used. In an environment with a lower amount of acidity, corrosiveness, and microbial bugs, a silver content of 1.5% can be used. However, in areas where the acidity, corrosiveness, and amount of microbial bugs are higher, a higher content of silver such as 5.25% may be desired. Furthermore, with the price of silver constantly increasing it will be desirable to use a silver content that is still effective but is not cost prohibitive. This addition in combination with the other desired metallic elements increase the efficiency and effectiveness of the metallurgical reaction and results in a more effective filtering system.

As seen in FIGS. 3C-3D, in one preferred embodiment, the metal alloy is comprised of shavings that are placed within a vessel between two pipes or vessels of the drilling, transport, storage, or production units. This embodiment allows the fluid to flow through and around the metal alloy, providing a turbulent flow to increase the amount of surface area the fluid encounters. Similarly, this system can also be comprised of a set of rods within the vessel, for the fluid to interact. Alternatively, the filtering system can be comprised of the filtering metal alloy that can be placed in vessels throughout the drilling, transport, storage, or production units. In this embodiment, the metal alloy can be comprised of, but not limited to, rods, shot or balls that can be placed and retrieved from the vessels with ease. The metal alloy can be housed between the metal alloy cartridge end plates or within a metal alloy cartridge cylinder.

In FIGS. 4A and 4B, an aboveground embodiment 400A/400B is shown that allows the filtering alloy to be utilized within a filtering vessel 402. The filtering vessel 402 can be constructed in various shapes and sizes. The filtering vessel 402 can have an input port 408 that allows for the inflow of an unfiltered fluid 403 and an output port 410 that allows for the outflow of a filtered fluid 404. An access point 406 in certain embodiments would allow for the removal and changing of the filter cartridge 412. The metal alloy within the filter cartridge 412 can be used in a combination of ways, e.g., rods and shavings can be used to increase the surface area the fluid encounters by increasing the turbulence of the fluid. An increase in fluid turbulence causes the fluid to be stimulated resulting in more of the fluid coming in contact with the surface area of the metal alloy. After the fluid has flowed through the rod and shaving filter cartridge 412, the filtered fluid 404 can exit the filtering vessel 402 through the output port 410. Multiple cartridges 412 can be used and multiple access points provided in the filtering vessel 402 to increase effectiveness. This embodiment can also be utilized in an inline system as illustrated in FIG. 4B. An inline filter housing 416 allows for a second filter cartridge 414 to be placed inline with the output flow of the filtering vessel 402. Moreover, the filter cartridge(s) 412 can be placed in numerous positions or combinations within the above ground system 400A/400B as illustrated in FIGS. 4A and 4B through bolts or other fasteners, attaching the filter cartridge(s) 412 to the body of the filter vessel 402 or additional filter cartridge(s) 412 or placing the filter cartridge(s) 412 in enclosures within the filter vessel 402.

Figure 5A:
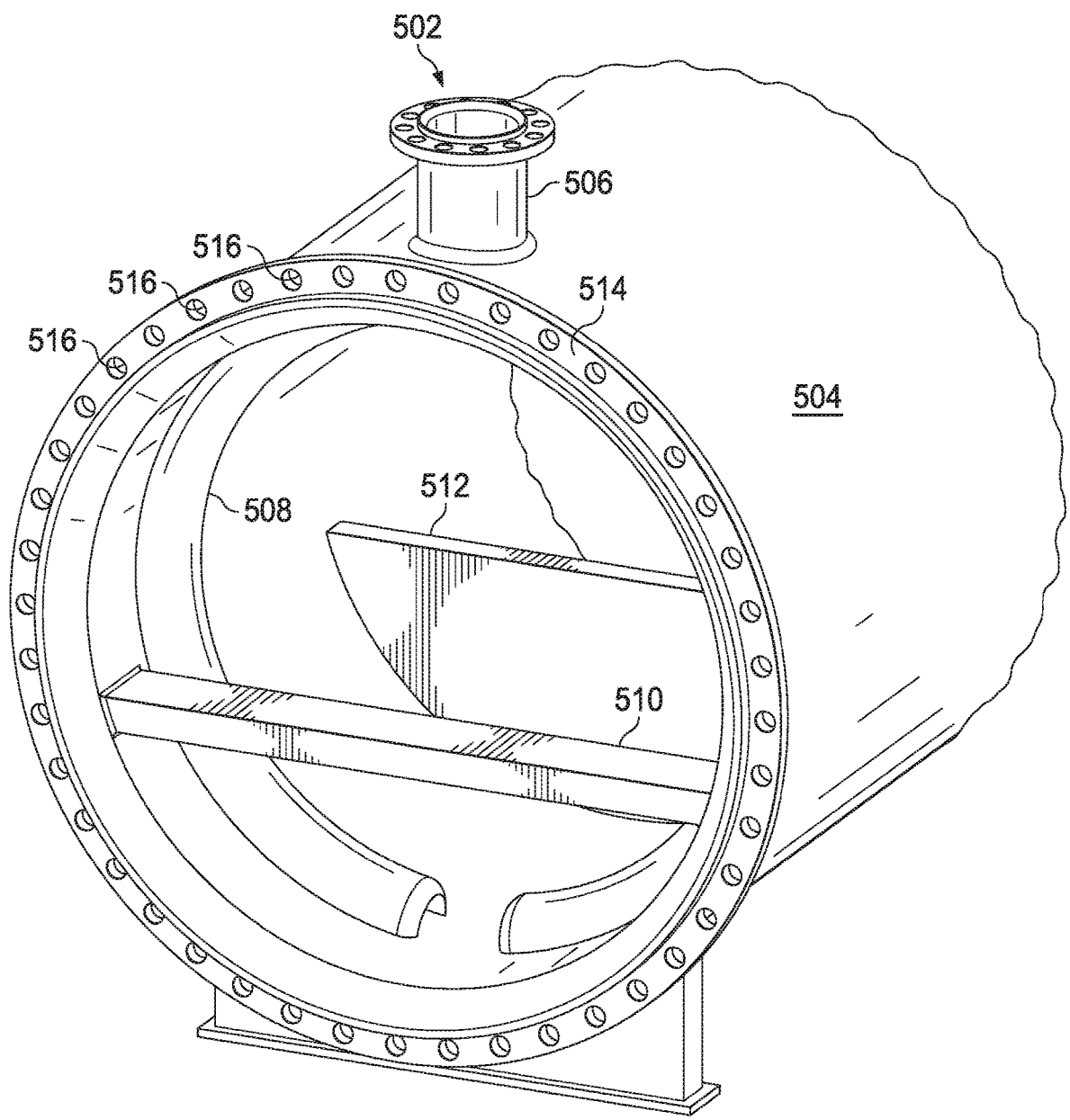
FIG. 5A illustrates a Horizontal Heated Separator.
Figure 5B:
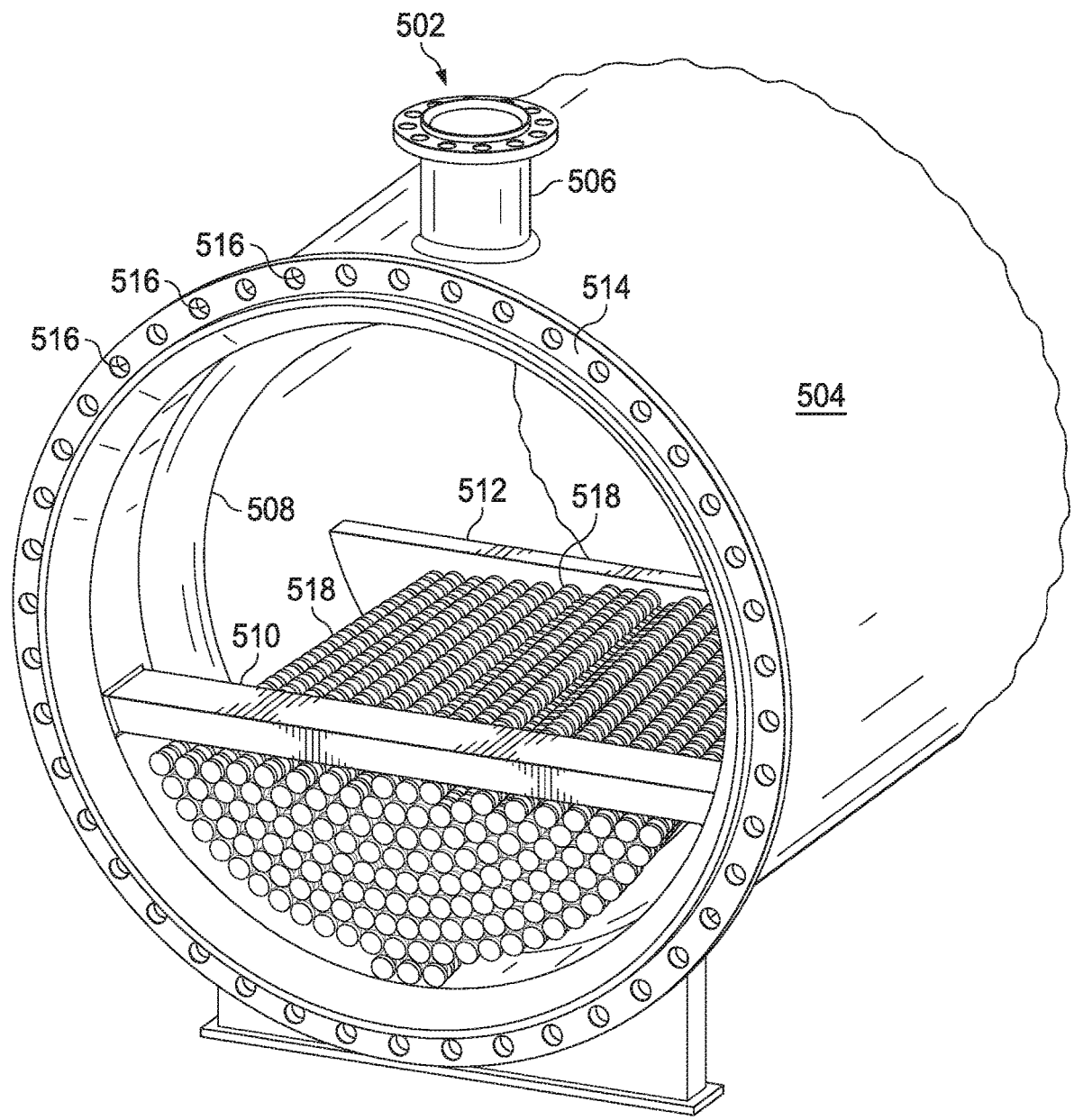
FIG. 5B illustrates a Horizontal Heated Separator utilizing the metal alloy.

In FIGS. 5A and 5B, an alternative embodiment for the use of the metal alloy within a Horizontal Heated Separator ("HHS") is illustrated. Fluid 502 enters the HHS 504 through the fluid inlet 506. The fluid 502 is an unfiltered fluid that is then separated into its liquid and gaseous components via the HHS 504. A fluid inlet extension 508 moves the fluid from the fluid inlet 506 into the bottom of the HHS 504. The fluid inlet extension 508 can be square, rectangular, round, oval, or other geometric shape. The fluid 502 is then below the crossbar 510 and dam 512. The HHS 504 can be sealed through the outer flange 514 and attachment bores 516. In FIG. 5B, the bottom of the HHS 504 is shown lined with a plurality of the filtering alloy components 518 in accordance with an embodiment of the invention disclosed which can be placed in a manner to cause turbulence that generates a reaction due to the interaction with the surface area of the filtering alloy. When the filtering alloy is in a rod shaped form, it can be secured below and along the crossbar 510. Additionally, a filtering cartridge can be placed on the input or the output of the HHS to utilize the filtering alloy. When used in a system that is heated, the overall effectiveness of the filtering alloy is increased. The heating accelerates the reaction process in embodiments of the present invention. This is also beneficial when used in a downhole embodiment.

Figure 6:
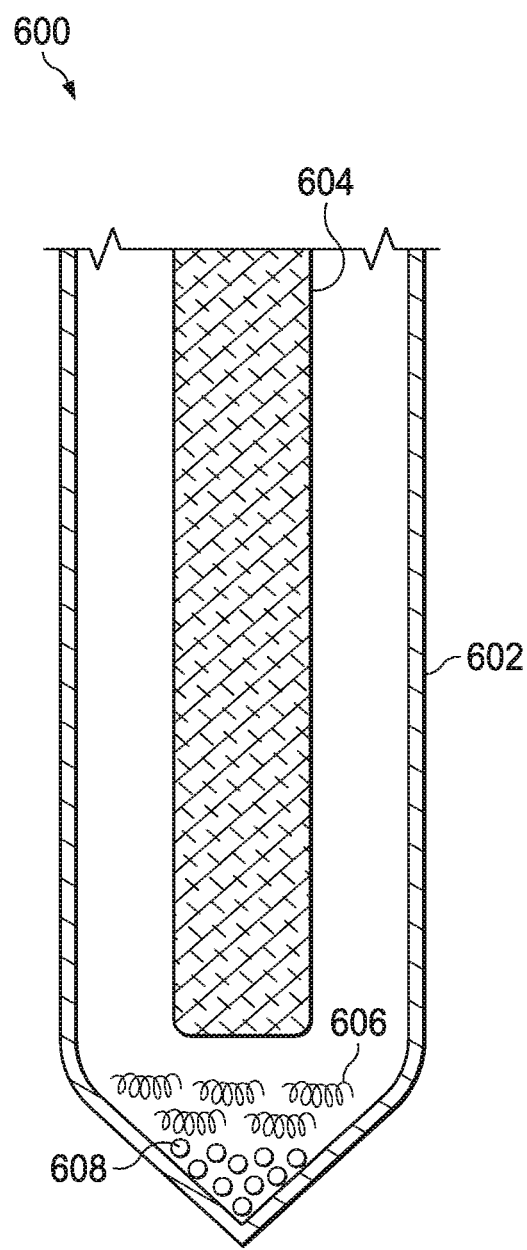
FIG. 6 illustrates a downhole embodiment with a core of the metal alloy.

For a preferred downhole embodiment, the metal alloy can be placed within a downhole anchor 600 as shown in FIG. 6. The anchor can be comprised of an outer cylindrical surface 602, with holes through the outer surface that will allow oil and/or water to flow into the anchor. Within the cylindrical surface 602 is the metal alloy in various forms, e.g., metal alloy shavings 606 and metal alloy balls 608 can be employed through which the fluid mixture flows. The metal alloy can be placed within the anchor utilizing a filter cartridge 604. As the unfiltered fluid encounters the metal alloy, a metallurgical reaction is initiated that causes the pH level to change and subsequently the corrosive nature of the fluid to be reduced. The forms of the metal alloy utilized with this embodiment can be used to increase the turbulence of the system in order to increase the surface area of the metal alloy that the fluid encounters. A rod can be used as the center of the downhole anchor filter cartridge 604 with shavings, shot, or balls surrounding the rod or in reverse with the metal alloy rods forming a cylinder wall, surrounding metal alloy shavings and/or metal alloy shot or balls. Alternatively, without utilizing a filter cartridge, the anchor can be filled with shavings and/or shot and/or balls, thus increasing the surface area of the metal alloy the fluid encounters.

An advantage of this system over prior art systems is the ability to remove the rods or other forms of the filtering alloy once they have stopped reacting. As shown in FIGS. 3A and 3D, the filtering alloy can be removed not only from the vessel, but also from the filter canister. The metal alloy can then be cleaned utilizing shot blasting and then melted down to be reformed. The filter canister shown is FIGS. 3A-3C illustrates how the position of the rods within the canister can help to increase the turbulence and the surface area the fluid will encounter during its passage through the filter canister.

The metal alloy can be removed from the filter canister for cleaning. A furnace is utilized to burn off any combustible or explosive material along the metal alloy. The metal alloy is then shot blasted to remove any of the residual materials left after the burning. The clean metal alloy is then analyzed using a spectrometer to determine if there is any change to the metal alloy composition. If there is any change to the metal alloy composition the metal alloy is melted down and realloyed to the proper ranges and recast into new metal alloy shapes.

For a preferred standing fluid embodiment, the filtering alloy can be utilized in a shot or ball shape. The standing fluid can be in a storage vessel or oil/water separator where the fluid has potentially been filtered previously. The shot or ball shape can be placed within the vessel and rest along the bottom or other location within the vessel. Alternatively, the shot or ball shaped alloy can be suspended in the vessel utilizing a cage. While not coming in direct contact with a majority of the fluid as in a flowing fluid embodiment, there can still be the metallurgical reaction that results in a change to the pH level. This is advantageous because it helps to not only change the pH level of the fluid but also helps protect the vessel.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Field of the Disclosure," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

I claim:
1. An apparatus for fluid filtration comprising:
 a filter cartridge for removable placement in a vessel, the filter cartridge allowing fluid in the vessel to flow around and through the filter cartridge;
 an upper filter cartridge end plate of the filter cartridge;
 a lower filter cartridge end plate of the filter cartridge, wherein the upper filter cartridge end plate is distal from the lower filter cartridge end plate; and a filter material comprising a plurality of pieces formed from a metal alloy extending from the upper filter cartridge end plate and the lower filter cartridge end plate;

wherein the metal alloy comprises at least 20.0% zinc, at least 15.5% nickel, at least 2.5% tin, at least 1.5% lead, at least 1.5% silver, at least 0.5% iron, and a remainder of copper.

2. The apparatus for fluid filtration of claim 1, wherein the metal alloy comprises no more than 24.0% zinc, no more than 17% nickel, no more than 3.5% tin, no more than 2.5% lead, no more than 5.25% silver, no more than 1.5% iron, and a remainder of copper.

3. The apparatus for fluid filtration of claim 1, wherein the apparatus further comprises a perforated plate between the upper filter cartridge end plate and the lower filter cartridge end plate.

4. The apparatus for fluid filtration of claim 1, wherein the upper filter cartridge end plate further comprises a central aperture.

5. The apparatus for fluid filtration of claim 1, wherein the upper filter cartridge end plate further comprises at least one perforation bore through upper filter cartridge end plate.

6. The apparatus for fluid filtration of claim 1, wherein the lower filter cartridge end plate further comprises a central aperture.

7. The apparatus for fluid filtration of claim 1, wherein the lower filter cartridge end plate further comprises at least one perforation bore through lower filter cartridge end plate.

8. The apparatus for fluid filtration of claim 1, wherein the metal alloy is formed into rods.

9. The apparatus for fluid filtration of claim 8, wherein the rods are further comprises of rod teeth and rod valleys.

* * * * *